US011596972B2

(12) United States Patent
Grünenfelder et al.

(10) Patent No.: US 11,596,972 B2
(45) Date of Patent: Mar. 7, 2023

(54) COAXIAL CARTRIDGE FOR MULTI-COMPONENT MATERIALS AND METHOD OF ASSEMBLING A COAXIAL CARTRIDGE

(71) Applicant: Sulzer Mixpac AG, Haag (CH)

(72) Inventors: Ralf Grünenfelder, Wangs (CH); Eberhard Remo, Maienfeld (CH); Hayden Turner, Ayer, MA (US)

(73) Assignee: MEDMIX SWITZERLAND AG, Haag (CH)

( * ) Notice: Subject to any disclaimer, the term of this patent is extended or adjusted under 35 U.S.C. 154(b) by 15 days.

(21) Appl. No.: 17/419,861

(22) PCT Filed: Dec. 5, 2019

(86) PCT No.: PCT/EP2019/083826
§ 371 (c)(1),
(2) Date: Jun. 30, 2021

(87) PCT Pub. No.: WO2020/141038
PCT Pub. Date: Jul. 9, 2020

(65) Prior Publication Data
US 2022/0072581 A1 Mar. 10, 2022

(30) Foreign Application Priority Data
Jan. 3, 2019 (EP) .................................... 19150167

(51) Int. Cl.
*B05C 17/005* (2006.01)
*B29D 99/00* (2010.01)

(52) U.S. Cl.
CPC .. *B05C 17/00559* (2013.01); *B05C 17/00506* (2013.01); *B29D 99/00* (2013.01)

(58) Field of Classification Search
CPC ........ B05C 17/00559; B05C 17/00506; B29D 99/00; B65D 81/325; B65B 29/10
See application file for complete search history.

(56) References Cited

U.S. PATENT DOCUMENTS 4,294,351 A  10/1981  Cheetham
4,340,154 A   7/1982  vanManen
(Continued)

FOREIGN PATENT DOCUMENTS

DE    3708803 A1   9/1988
DE   20318444 U1   3/2004
(Continued)

OTHER PUBLICATIONS

International Search Report dated Feb. 12, 2020 in corresponding International Patent Application No. PCT/EP2019/083826, filed Dec. 5, 2019.

*Primary Examiner* — Bob Zadeh
(74) *Attorney, Agent, or Firm* — Global IP Counselors, LLP

(57) ABSTRACT

A coaxial cartridge for multi-component materials includes a head part having an outlet, an inner tube forming a first storage compartment configured to store a first component inner tube forms part of the outlet, and an outer tube. The inner tube is arranged within the outer tube at a longitudinal axis that is common to both the inner tube and the outer tube. A space formed between the outer tube and the inner tube forms a second storage compartment configured to store a second component. The outer tube forms a further part of the outlet.

19 Claims, 3 Drawing Sheets

(56) References Cited

U.S. PATENT DOCUMENTS

| | | | |
|---|---|---|---|
| 4,366,919 | A | 1/1983 | Anderson |
| 4,799,801 | A | 1/1989 | Bruning |
| 4,858,759 | A | 8/1989 | Mauthe et al. |
| 5,310,091 | A | 5/1994 | Dunning et al. |
| 5,339,992 | A | 8/1994 | Barthomeuf et al. |
| 5,535,922 | A | 7/1996 | Maziarz |
| 5,566,860 | A * | 10/1996 | Schiltz .............. B05C 17/00513 222/137 |
| 5,647,481 | A | 7/1997 | Hundertmark et al. |
| 5,692,644 | A | 12/1997 | Gueret |
| 6,681,957 | B1 * | 1/2004 | Green ............... B05C 17/00553 222/137 |
| 7,497,355 | B2 | 3/2009 | Horner et al. |
| 10,144,572 | B2 | 12/2018 | Springhorn |
| 2005/0093300 | A1 | 5/2005 | Brugner et al. |
| 2006/0054636 | A1 | 3/2006 | Brennan et al. |
| 2017/0253411 | A1* | 9/2017 | Murdoch .................. B65B 7/28 |
| 2022/0072581 | A1* | 3/2022 | Grünenfelder ....... B65D 81/325 |

FOREIGN PATENT DOCUMENTS

| | | | | |
|---|---|---|---|---|
| DE | 20318444 | U1 * | 4/2004 | ....... B05C 17/00516 |
| EP | 1 679 126 | B1 | 7/2006 | |
| EP | 1 633 672 | B1 | 7/2007 | |
| EP | 1 634 654 | B1 | 8/2007 | |
| EP | 2384883 | A1 * | 11/2011 | ............. B29C 69/02 |
| EP | 2 862 812 | A1 | 4/2015 | |
| GB | 2 276 365 | A | 9/1994 | |
| GB | 2276365 | A * | 9/1994 | ........... B65D 81/325 |
| JP | H08502712 | A * | 3/1996 | ........... B65D 81/325 |
| WO | 2016/036620 | A1 | 3/2016 | |

\* cited by examiner

COAXIAL CARTRIDGE FOR MULTI-COMPONENT MATERIALS AND METHOD OF ASSEMBLING A COAXIAL CARTRIDGE

CROSS-REFERENCE TO RELATED APPLICATIONS

This application is a U.S. National Stage application of International Application No. PCT/EP2019/083826, filed Dec. 5, 2019, which claims priority to European Patent Application No. 19150167.5, filed Jan. 3, 2019, the contents of each of which are hereby incorporated herein by reference.

BACKGROUND

Field of the Invention

The present invention relates to a coaxial cartridge for multi-component materials, the coaxial cartridge can comprise a head part having an outlet, an inner tube having a space present therein, the space forming a first storage compartment configured to store a first component, the inner tube forms part of the outlet, and an outer tube, the inner tube arranged within the outer tube at a longitudinal axis that is common to both the inner tube and the outer tube, a space can be formed between the outer tube and the inner tube and forms a second storage compartment configured to store a second component, and the outer tube forms a further part of the outlet. The invention further relates to a method of assembling a coaxial cartridge.

Background Information

Conventional two component co-axial cartridges are used so that one and the same hand-held dispenser can be used to dispense both one component and multi-component materials. Such multi-component material is used in a plethora of fields of application ranging from industrial applications, such as the use of adhesives to bond structural components one to another, or as protective coatings for buildings or vehicles, to medical and dental applications. The multi-component material is, for example, a two-component adhesive comprising a filler material and a hardener. Co-axial cartridges are available with various ratios of filling, also known as mixing ratios, for example at mixing ratios of 1:1, 2:1, 4:1, 10:1 etc.

Since the producer of the coaxial cartridge does not necessarily produce the multi-component material stored within the coaxial cartridge, empty coaxial cartridges are frequently supplied to the producer of the multi-component material. The producer of the multi-component material then fills the coaxial cartridges with the desired multi-component material.

SUMMARY

It has been determined that when backfilling coaxial cartridges, problems can arise with respect to the venting of residual air from the coaxial cartridge. These problems can lead to a reduced storage life of components stored in the co-axial cartridge. Furthermore, problems can arise with respect to inserting the piston into the cartridge correctly. This problem of the correct piston insertion can lead to leaks also leading to a reduction in storage life. For this reason many producers favor the option of front filling coaxial cartridges in order to avoid problems associated with both the venting of residual air from the coaxial cartridge and an incorrect placement of the piston.

It has been determined that the prior art designs of coaxial cartridges have the further drawback of having a comparatively high extrusion force required to dispense the material making the dispensing thereof more difficult. Yet a further drawback is presented by the amount of volume of material which is left behind as waste in the cartridge once this is empty. The latter problem is particularly undesirable due to fact that the coaxial cartridge is dimensioned to fit into the commercially available hand-held dispensers so that its outer size, e.g. diameter and length, and hence the maximum filling volume is pre-defined and any extra amount of waste is thus highly undesirable.

By way of example, EP1679126B1 discloses a coaxial cartridge that is configured to be used with commercially available hand-held dispensers. The cartridge shown in EP1679126B1 has been designed to achieve a compromise between filing volume and waste volume left behind in the cartridge. In order to achieve this compromise a two part piston design is used and the chambers of the cartridge in the storage position are arranged one after one another along the longitudinal axis of the cartridge.

However, due to the comparatively complex design of the cartridge, i.e. the two-part piston where each of the two parts of the piston are spaced apart axially by the length of the first chamber of the cartridge, and the components cooperating therewith, the maximum filling volume is reduced and it is generally not possible to fill the different components at the same time, but rather these have to be filled one after another which leads to an increased filling time.

In view of the above it is an object of embodiments of the present invention to further increase the available filling volume of a coaxial cartridge while at least maintaining preferably further reducing the waste volume remaining in the cartridge for front filled cartridges. It is a further object of embodiments of the invention to reduce the extrusion force on a cartridge while dispensing in order to improve the handling of the coaxial cartridges. It is a further object of embodiments of the present invention to make available a coaxial cartridge that can be assembled and produced in an as cost effective and facile manner as possible.

This object is satisfied by a discharger described herein.

An embodiment of such a coaxial cartridge for multi-component materials comprises:

a head part having an outlet, an inner tube having a space present therein, the space forming a first storage compartment configured to store a first component, wherein part of the inner tube forms part of the outlet, and an outer tube, wherein the inner tube is arranged within the outer tube at a longitudinal axis of the coaxial cartridge, with the longitudinal axis being common to both the inner tube and the outer tube; and wherein a space formed between the outer tube and the inner tube forms a second storage compartment configured to store a second component, and wherein part of the outer tube forms a further part of the outlet, wherein the inner tube is connected to the outer tube at first and second points of connection respectively present at the head part, with the first and second points of connection being arranged at different positions at the head part, with the different positions being arranged spaced apart at different distances from the longitudinal axis, and wherein the first point of connection is formed at the outlet.

In this connection it should be noted that the outlet is typically formed so that it can be coupled to existing mixers and dispensers.

By forming the inner storage compartment within the outer storage compartment no complex axially spaced apart two-part design of the piston is required. This structure makes available more storage space than is achievable in prior art coaxial cartridges. By way of example the filling volume is increased by 10% from 255 mL achievable with the coaxial cartridge of EP1679126B1 to 276 ml respectively 281 mL achievable with the design of the cartridge presented herein.

Moreover, by forming the first storage chamber within the second storage chamber at the same axial height, front filling of two components at the same time is possible leading to a reduction in the time required to fill the cartridges.

Due to the fact that two points of connection are used it has furthermore been found that the connection between the inner tube and outer tube is more rigid, whereby the extrusion force on dispensing can be reduced due to the increased rigidity of the coaxial cartridge.

Moreover, an amount of dead space, i.e. volume in which waste material that is left behind can be collected, can be reduced and can lie in a region between 4.5 mL and 5.2 mL depending on the precise design of the cartridge. In comparison to this the coaxial cartridge of EP1679126B1 has a volume of dead space of 5 mL. The reduced amount of dead space can be achieved due to the ability of using more filigree components in the coaxial cartridge as this is more rigid per se.

Thus, by designing the cartridge according to the embodiments presented herein with the first storage chamber that is arranged at the same axial height as the second storage chamber and by providing two points of connection to connect the inner tube to the outer tube, a coaxial cartridge is made available that has an increased filing volume while at least substantially maintaining the waste volume. Since the design of the piston can be adapted, it is less complex and the pistons for each storage chamber can work independently from one another, such that the pressure on dispensing can be further reduced improving the handling of the coaxial cartridge in a hand-held dispenser.

The first and second points of connection can be formed by different types of connections. This means that the first and second points of connection are not only formable at different positions at the head part of the cartridge, but can also comprise different components, with each component being adapted to the position at which the connection is made available.

The outlet and the first point of connection can be provided at a further distance from the longitudinal axis than the second point of connection. Forming the outlet and the first point of connection in an eccentric, i.e. decentralized manner, leads to an advantageous design, as the dead space present within a cartridge and hence the waste volume can be reduced by arranging the outlet offset from the longitudinal axis rather than at the longitudinal axis.

The first point of connection can be formed by a radially outwardly projecting lip that is provided at a part of the inner tube that projects into a part of the outer tube, with the radially outwardly projecting lip then engaging a step-like portion formed at the part of the outer tube into which the inner tube projects. In this way a reliable connection can be formed between the inner and outer tube at the outlet.

The first point of connection can be formed by a snap fit connection present at the outlet between the inner tube and the outer tube. A snap fit connection is an advantageous type of connection between two components that can be produced in a cost effective and simple manner.

The second point of connection can be formed at a smaller distance from the longitudinal axis than the first point of connection. By forming the second point of connection in a more a centralized manner than the first point of connection means that the connection between the inner and outer tube can be improved. Moreover, an assembly of the coaxial cartridge can be simplified as it is easier to position and seal the inner tube relative to the outer tube. Thus, due to the more centralized design of the second point of connection in contrast to the first point of connection, the three functions the connections between the inner tube and the outer tube have to satisfy, namely sealing, holding, and positioning, can be improved in comparison to prior art cartridges.

The second point of connection can be formed between an inner surface of the outer tube that abuts an outer surface of the inner tube at the head part. Such a point of connection can be used to further minimize any residual dead space within a cartridge and lead to an improved positioning and holding of the inner tube relative to the outer tube.

A seal can be formed between the inner tube and the outer tube at the head part, wherein the seal surrounds the second point of connection, optionally wherein the seal is formed between the inner surface of the outer tube that abuts the outer surface of the inner tube. The provision of a seal between the inner tube and the outer tube can prevent a cross-contamination from occurring between the first and second storage compartments.

The second point of connection can be formed by a plug element disposed at the inner tube that cooperates with a counter plug element, in particular a plug receiving element, disposed at the outer tube, optionally wherein the counter plug element is configured to receive the plug element, preferably with the plug element being press fit into the plug receiving element. The method of assembling the coaxial cartridge can be simplified by the use of a plug element and a counter plug element cooperating therewith.

The inner tube can comprise a cylindrical outlet portion as the part that forms part of the outlet that is inserted into a cylindrical outlet portion disposed at the outer tube that forms the further part of the outlet, optionally wherein the part of the inner tube that projects into a part of the outer tube is formed by the cylindrical outlet portion and the part of the outer tube into which the inner tube projects is formed by the cylindrical outlet portion disposed at the outer tube. The provision of cylindrically shaped parts that cooperate with one another, on the one hand, simplifies the assembly of the coaxial cartridge. On the other hand, a reliable connection can thereby be formed if the connection is formed e.g. as the aforementioned snap-fit connection.

One or more sealing means or sealing members can be disposed between the cylindrical outlet portion of the inner tube and the cylindrical outlet portion of the outer tube. In this way a seal is present between the inner tube and the outer tube that, on the one hand, can prevent a cross-contamination from occurring and, on the other hand, increase the storage life of components stored in the coaxial cartridge.

The cylindrical outlet portion of the inner tube can comprise a first passage leading from the first storage compartment to a first outlet opening of the outlet and a second passage leading from the second storage compartment to a second outlet opening of the outlet. By forming the outlet passages from both storage compartments within one component can ensure that no cross-contamination between materials stored within the coaxial cartridge can take place prior to the materials exiting the coaxial cartridge via the outlet.

The outlet can be a side by side outlet comprising first and second outlets having first and second outlet openings. It has hitherto been found that side by side outlets can beneficially be used in front filling applications.

An area of the first outlet opening can differ from an area of the second outlet opening. This can be particularly advantageous if the contents of the cartridge is intended to be dispensed a multiple of times, as the respective outlets can then be sealed off with a cap which then has differently shaped or sized plungers engaging the respective outlets. Such differently shaped or sized components make available a type of alignment means (aligner) at the outlet.

The first and second outlets can comprise inner sealing surfaces, optionally wherein a supporting rib is disposed between the cylindrical outlet portion of the outer tube and the cylindrical outlet portion of the inner tube, with the supporting rib being disposed at the same axial height as the inner sealing surfaces or between the axial height of the supporting rib and a respective inlet opening of a passage of the outlet, in particular wherein the supporting rib is arranged adjacent to the axial height of the inner sealing surface.

The inner sealing surfaces can be provided to seal with respect to parts of a cap that can be inserted into the outlet during the storage of the cartridge in order to positively influence the storage life of the components stored in the cartridge. The inner sealing surfaces can also be used when front filling the cartridge in order to seal between the filling nozzle and the outlet to prevent contaminants from being introduced into the coaxial cartridge. The supporting rib is preferably arranged in the region of the inner sealing surfaces as a support member that strengthens that part of the outlet to ensure that the inner sealing surfaces engage the respective part with which they cooperate.

The inner tube and the outer tube can comprise projections that project from a respective end face formed at the head part into the first and second storage compartments. The projections can be formed to engage recesses present at the piston in order to further minimize any dead space within the cartridge so as to further reduce any waste of material stored in the cartridge. The projections can be seals that cooperate with part of the piston.

The coaxial cartridge presented herein can further comprise a respective piston arranged in each storage chamber at an end of the coaxial cartridge that is disposed opposite of the head part.

The first and second storage compartments of the coaxial cartridge can comprise respective two-component materials. Such two-component materials can be selected from the group of members consisting of construction material, sealants, bond material, adhesives, paints, coatings and protective coatings and as such the coaxial cartridge presented herein can be used in an industrial sector both for the production of products as well as for the repair and maintenance of existing products, e.g. in the building industry, the automotive industry, the aerospace industry, in the energy sector, e.g. for wind turbines, etc. The coaxial cartridge presented herein can also be used in the medical, dental field or veterinary field.

According to a further aspect, embodiments of the present invention relate to a method of assembling a coaxial cartridge, in particular a coaxial cartridge as discussed in the foregoing, the method comprising the steps of:

providing an outer tube having a part of an outlet formed at a head part of the outer tube, inserting an inner tube into the outer tube, with the inner tube comprising a remaining part of the outlet;

connecting the inner tube to the outer tube at two points of connection at the head part to form the coaxial cartridge with two storage compartments, wherein a first point of connection is formed at the outlet, optionally with a second point of connection being formed between abutting surfaces of the inner tube and the outer tube.

The advantages discussed in the foregoing in connection with the coaxial cartridge are achievable by the method of assembly and hence likewise hold true for the method presented herein.

BRIEF DESCRIPTION OF DRAWINGS

The invention will be explained in more detail hereinafter with reference to the drawings.

DETAILED DESCRIPTION

Figures 1A, 1B:
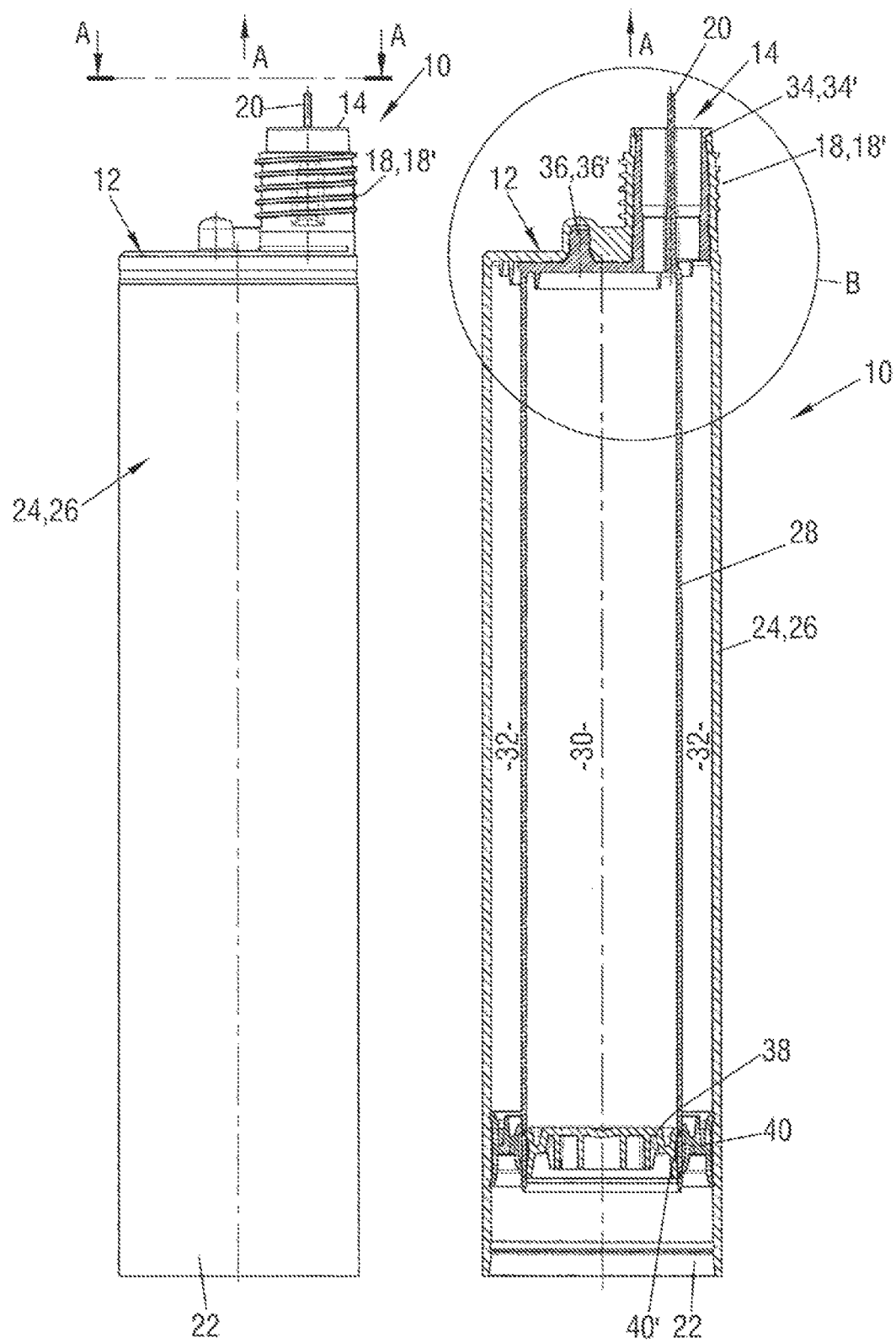
FIG. 1A is a side view of an open and empty coaxial cartridge.
FIG. 1B is a sectional view of the coaxial cartridge of FIG. 1A along the sectional line A-A.

In the following the same reference numerals will be used for parts having the same or equivalent function. Any statements made having regard to the direction of a component are made relative to the position shown in the drawing and can naturally vary in the actual position of application.

FIG. 1A shows a side view of an open and empty coaxial cartridge 10. The coaxial cartridge 10 comprises a head part 12 having an outlet 14. The outlet 14 can be sealed off with a plunger 98 that is held in position by a cap 16 (see FIG. 2A) that can be attached to the outlet 14.

In the example shown in FIG. 1A the cap 16 can be attached to the outlet 14 by a threaded connection 18 of which an external thread 18' is shown in FIG. 1A. Other forms of connections such as a bayonet type of connection, a plug and rotate type of connection etc. can also be provided in order to attach the cap 16 to the outlet 14 of the coaxial cartridge 10.

A dividing wall 20 of the outlet 14 projects from the outlet 14 generally in parallel to a longitudinal axis A of the coaxial cartridge 10.

The longitudinal axis A of the coaxial cartridge 10 coincides with the common axis of the coaxial cartridge 10 and extends from the head part 12 to the piston end 22 disposed opposite of the outlet 14. The outlet 14 is eccentrically arranged with respect to the longitudinal axis A.

The cartridge 10 further comprises a cartridge wall 24 that extends from the head part 12 to the piston end 22. The cartridge wall 24 is formed by an outer tube 26.

FIG. 1B shows a sectional view of the coaxial cartridge of FIG. 1A along the sectional line A-A. The coaxial cartridge 10 further comprises an inner tube 28 having an inner space 30 forming a first storage compartment configured to store a first component M (see FIG. 2B). The inner tube 28 is arranged within the outer tube 26 at the longitudinal axis A, with the longitudinal axis A being common to both the inner tube 28 and the outer tube 26.

Figures 2A, 2B:
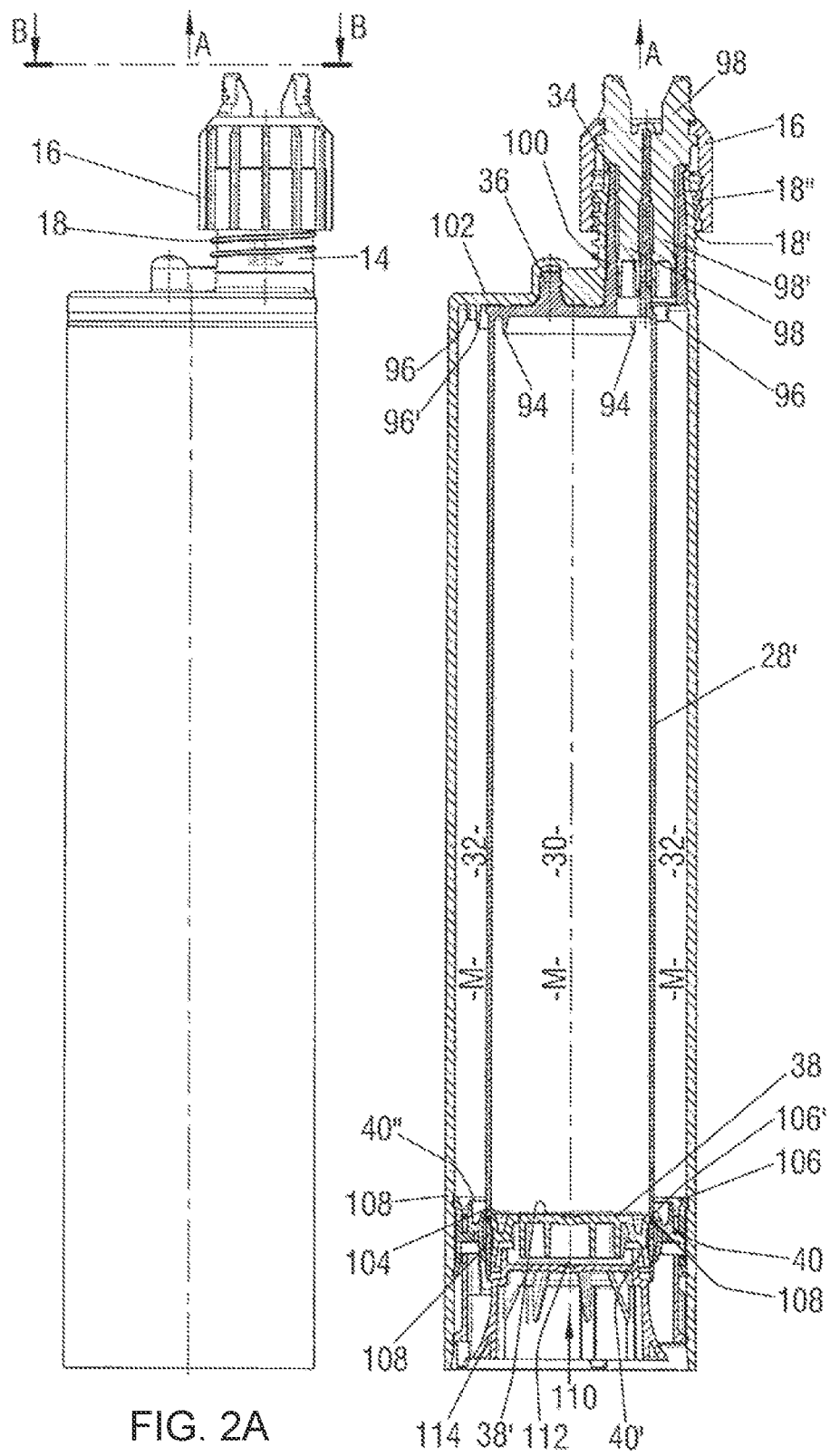
FIG. 2A is a side view of a filed coaxial cartridge with an installed cap.
FIG. 2B a sectional view of the coaxial cartridge of FIG. 2A along the sectional line B-B.

A space 32 formed between the outer tube 26 and the inner tube 28 forms a second storage compartment configured to store a second component M' (see FIG. 2B).

The inner tube 28 is connected to the outer tube 26 at first and second points of connection 34, 36 respectively present at the head part 12. The first and second points of connection 34, 36 are arranged at different positions 34', 36' at the head part 12. The different positions 34', 36' are arranged spaced apart at different distances from the longitudinal axis A. In the present example both the first and second points of connection 34, 36 are eccentrically arranged with respect to the longitudinal axis A.

It should be noted that the first and second points of connection 34, 36 are also formed by different types of connections in the present example. This means that at least the shape of the first type of connection 34 differs from that of the second type of connection 36. In addition to having a different shape the way in which the components of the first and second types of connection 34, 36 engage one another can also differ.

First and second pistons 38, 40 are arranged in the spaces 30, 32 at the piston end 22. The first piston 38 is arranged within the inner tube 28 and is configured to dispense the material M from the coaxial cartridge 10. The second piston 40 is arranged within the space 32 formed between the inner tube 28 and the outer tube 26 and is configured to dispense the material M' from the coaxial cartridge 10. The second piston 40 is a ring shaped piston with an aperture 40' at its center.

The first and second pistons 38, 40 are arranged moveable along the longitudinal axis A between the piston end 22 and the outlet 14. When front filling the coaxial cartridge 10 via the outlet 14, the first and second pistons 38, 40 are moved such that they are directly adjacent to the head part 12 and are then moved towards the piston end 22, rather like the action of filling a syringe, along the longitudinal axis A.

When dispensing the materials M, M' the pistons are moved in the opposite direction along the longitudinal axis A from the piston end 22 towards the head part 12. A plunger of a dispensing apparatus (not shown) that cooperates with the first and second pistons 38, 40 via a shuttle (not shown) or the like (such as a peeler device 110 discussed in connection with FIG. 2B) is inserted into the coaxial cartridge 10 from the piston end 22 for this purpose.

Figure 1C:
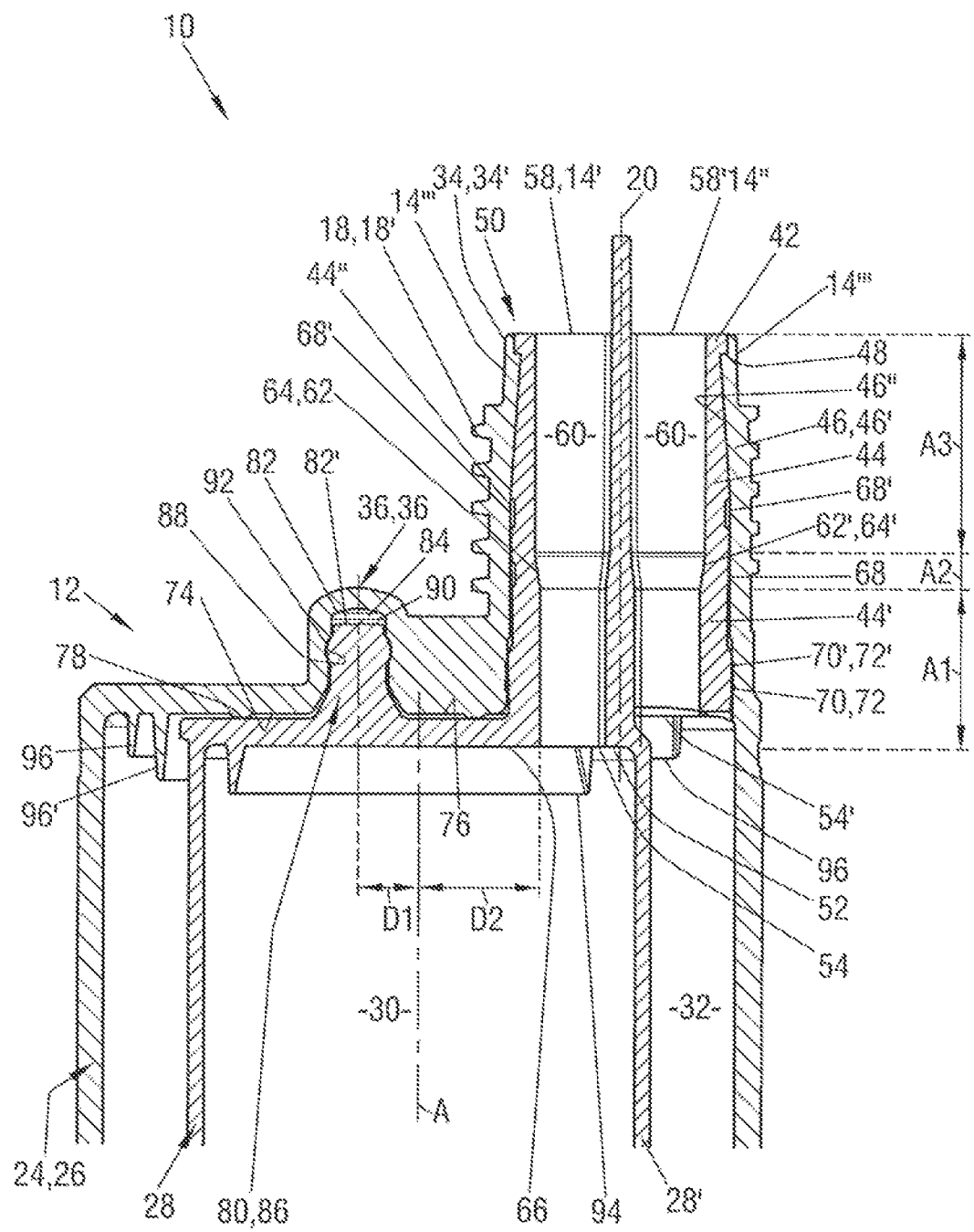
FIG. 1C is an enlarged sectional view of view C of FIG. 1B.

FIG. 1C shows an enlarged sectional view of view C of FIG. 1B, more specifically of the head part 12. The first point of connection 34 is formed at the outlet 14 and the outlet 14 and the first point of connection 34 are disposed at a further distance D2 from the longitudinal axis A than the distance D1 between the second point of connection 36 and the longitudinal axis A.

It should be noted in this connection that the distance D2 is the shortest distance between any part of the second point of connection and the longitudinal axis A.

The distance D2 can for example be selected in the range of 0 to 30%, preferably 10 to 25% of the internal radius of the outer tube 26 and in the present example amounts to 20% of the internal radius of the outer tube 26.

In this connection it should be noted that the distance D2 can, for example, be selected between 5% and 100% larger than the distance D1.

The distance D1 can for example be selected in the range of 0 to 45%, preferably 15 to 35% of the internal radius of the outer tube 26 and in the present example amounts to 30% of the internal radius of the outer tube 26.

The first point of connection 34 comprises a radially outwardly projecting annular lip 42 that is disposed at a part 44 of the inner tube 28 that projects into a part 46 of the outer tube 26, with the radially outwardly projecting lip 42 engaging an annular step-like portion 48 formed at the part 46 of the outer tube 26 into which the inner tube 28 projects at the outlet 14.

More specifically, the first point of connection 34 is formed by a snap fit connection 50 present at the outlet 14 between the inner tube 28 and the outer tube 26 that is formed by the radially outwardly projecting annular lip 42 that is configured to engage the annular step-like portion 48.

The inner tube 28 comprises a cylindrical outlet portion 44' as the part 44 that forms part of the outlet 14. The cylindrical outlet portion 44' is inserted into a cylindrical outlet portion 46' disposed at the outer tube 26. The cylindrical outlet portion 46' forms the further part 46 of the outlet 14.

The cylindrical outlet portion 44' comprises a convexly shaped outer surface 44" that cooperates with a concavely shaped inner surface 46" of the cylindrical outlet portion 46'.

It should be noted in this connection that the concavely shaped inner surface 46" and the convexly shaped outer surface 44' can extend in parallel to or substantially in parallel to the longitudinal axis A.

The outlet 14 is a side by side outlet 14 and at its end 52 facing the spaces 30, 32 has respective first and second inlet openings 54, 54'. At its end 56 opposite the end 52 the outlet 14 has first and second outlet openings 58, 58' of the first and second outlets 14', 14".

The inlet opening 54 is connected to the outlet opening 58 in a fluid conducting manner in order to transport only the material M from the space 30 out of the outlet 14 via a first passage 60.

The inlet opening 54' is connected to the outlet opening 58' in a fluid conducting manner in order to transport only the material M' from the space 32 out of the outlet 14 via a second passage 60'.

An area of the first outlet opening 58 differs from an area of the second outlet opening 58'. In fact the area of the first outlet opening 58 can be selected in the range of 80 to 120% of the area of the second outlet opening 58'.

In this connection it should be noted that the cylindrical outlet portion 44' of the inner tube 28 comprises both the first passage 60 leading from the first storage compartment formed by the space 30 to the first outlet opening 58 of the outlet 14 and the second passage 60' leading from the second storage compartment formed by the space 32 to the second outlet opening 58' of the outlet 14, with the first and second passages 60, 60' being separated from one another by the dividing wall 20. The dividing wall 20 extends from and is integrally formed with an outer wall 28' of the inner tube 28 in such a way that the material M, M' stored in the respective space 30, 32 can only come into contact with one another.

In this connection it should be noted that the outer wall 28' of the inner tube 28 is a cylindrical outer wall 28' that extends from the head part 12 to the piston end 22.

The area of the respective outlet opening 58, 58' is larger than the area of the respective inlet opening 54, 54' associated therewith. In this connection it should be noted that an area of the respective outlet opening 58, 58' can be selected in the range of 110 to 150%, in particular of 120 to 135%, of the area of the respective inlet opening 54, 54'.

The first and second outlets 14', 14" comprise inner sealing surfaces 62, 62' that circumferentially extend around the first and second passages 60, 60'. The inner sealing surfaces 62, 62' can be arranged at a part 64, 64' of the respective first and second passages 60, 60' which is arranged between the respective inlet opening 54, 54' and the respective outlet opening 58, 58' and which has the shape of a truncated cone with a wide part of the truncated cone being disposed closer to the respective outlet opening 58, 58' than the narrower part of the truncated cone.

The inner sealing surfaces 62, 62', respectively the part 64, 64', is arranged to extend over an axial height A2 which is above an axial height A1 measured as a distance between an inner end face 66 of the inner tube 28 and the start of the inner sealing surfaces 62, 62'.

The end of the inner sealing surfaces 62, 62' respectively of the part 64, 64' is spaced apart from the outlet openings 58, 58' of the first and second outlets 14', 14" by an axial height A3, with a height of the cylindrical outlet portion 44' of the inner tube 28 being the sum of the axial heights A1+A2+A3.

In this connection it should be noted that A1 is typically selected in the region of 30 to 45%, in particular in the region of 35 to 42% of the height of the cylindrical outlet portion 44' measured between the inner end face 66 of the inner tube 28 and the outlet openings 58, 58'.

It should further be noted that A2 is typically selected in the region of 5 to 15%, in particular in the region of 6 to 10% of the height of the cylindrical outlet portion 44' measured between the inner end face 66 of the inner tube 28 and the outlet openings 58, 58'.

It should further be noted that A3 is typically selected in the region of 40 to 65%, in particular in the region of 50 to 60% of the height of the cylindrical outlet portion 44' measured between the inner end face 66 of the inner tube 28 and the outlet openings 58, 58'.

A supporting rib 68 is arranged between the cylindrical outlet portion 46' of the outer tube 26 and the cylindrical outlet portion 44' of the inner tube 28. The supporting rib 68 shown in FIG. 1C is formed at the cylindrical outlet portion 44' of the inner tube 28, but could likewise be formed at the cylindrical outlet portion 46' of the outer tube 26.

In the drawing shown the supporting rib 68 is arranged at an axial height that is directly adjacent to an axial height of the inner sealing surfaces 62, 62' between the inner end face 66 of the inner tube 28 and the outlet openings 58, 58'.

It should be noted in this connection that the supporting rib 68 could also be arranged offset from or even spaced apart from the inner sealing surfaces 62, 62' between the inner end face 66 of the inner tube 28 and the outlet openings 58, 58'.

It should also be noted that a centering rib 68' can additionally be arranged between the outlet openings 58, 58' and the inlet openings 54, 54', more specifically between the supporting rib 68 and the outlet openings 58, 58', optionally on the convexly shaped outer surface 44" of the inner tube 28.

The function of the centering rib 68', if provided, is to axially align the cylindrical outlet portion 44' of the inner tube 28 relative to the cylindrical outlet portion 46' of the outer tube 26 in order to thereby further ensure the coaxial arrangement of the inner tube 28 and the outer tube 26 relative to the longitudinal axis A.

Two annular sealing lips 70, 70' are provided as sealing members 72, 72' between the cylindrical outlet portion 44' of the inner tube 28 and the cylindrical outlet portion 46' of the outer tube 26. The sealing lips 70, 70' shown in FIG. 1C are formed at the cylindrical outlet portion 46' of the outer tube 26, but could likewise be formed at the cylindrical outlet portion 44' of the inner tube 28.

The sealing lips 70, 70' are arranged at an axial height between the inner end face 66 of the inner tube 28 and the supporting rib 68 in order to prevent material M, M' from leaking between the cylindrical outlet portion 46' of the outer tube 26 and the cylindrical outlet portion 44' of the inner tube 28.

The sealing members 72, 72' are provided to prevent multi-component material M' stored in the space 32 forming the second storage compartment from exiting the coaxial cartridge 10 between the cylindrical outlet portion 44' of the inner tube 28 and the cylindrical outlet portion 46' of the outer tube 26.

FIG. 1C further shows that the second point of connection 36 is formed between an inner surface 74 of the outer tube 26 that abuts an outer surface 76 of the inner tube 28 at the head part 12. The outer surface 76 is oppositely disposed of the inner end face of the inner tube 28.

A seal 78 is formed between the inner tube 28 and the outer tube 26 at the head part 12. The seal 78 surrounds the second point of connection 36 and is formed between the inner surface 74 of the outer tube 26 and the outer surface 76 of the inner tube 28.

The second point of connection 36 is formed by a plug element 80 disposed at the inner tube 28 that cooperates with a plug receiving element 82 as a counter plug element which is disposed at the outer tube 26. The plug receiving element 82 is configured to receive the plug element 80. In the example shown the plug receiving element 82 receives the plug element 80 by a press fit.

The plug element 80 has plug part 86 having a collar 88, with the collar 88 having a wider diameter than the plug part 86 arranged at the end 90 of the plug element 80. A space 84 can be present between a base 82' of the plug receiving element 82 and end 90 of the plug element 80.

On connecting the plug element 80 to the plug receiving element 82, the collar 88 engages a ring-like recess 92 formed within the plug receiving element 82 and is thereby received by a press-fit in the plug receiving element 82.

FIG. 2A shows a side view of a filed coaxial cartridge 10 with the cap 16 installed at the outlet 14. The cap 16 is screwed onto the external thread 18' present at a collar 100 of the outlet 14. The collar 100 projects from the front end 102 of the outer tube 26.

FIG. 2B shows a sectional view of the coaxial cartridge 10 of FIG. 2A along the sectional line B-B. The coaxial cartridge 10 is filed with the multi-component materials M, M'. In order to ensure that the multi-component materials M, M' can be stored for a desired and pre-defined duration, the plunger 98 is inserted into first and second passages 60, 60' of the outlet 14 and is retained at the outlet 14 by the cap 16. The cap 16 is retained at the outlet 14 by screwing this to the external thread 18' present at the collar 100 of the outlet 14. For this purpose the cap 16 has an internal thread 18".

The plunger 98 comprises first and second plungers 98', 98" that are respectively inserted into the first and second passages 60, 60' and that abut the inner sealing surfaces 62, 62' in order to ensure a seal is present therebetween such that the material M, M' can be stored for the desired and pre-defined duration.

The supporting rib 68 is provided to support the inner sealing surfaces 62, 62' such that they are held in position when the first and second plungers 98', 98" are inserted into the first and second passages 60, 60', thereby ensuring a sealing contact between the inner sealing surfaces 62, 62' and the first and second plungers 98', 98".

Other types of caps are well known to the person skilled in the art and can naturally also be used. Also a film seal could be present in the region of the outlet openings 58, 58' to further ensure the desired and pre-defined storage life of the multi-component material M, M' stored in the coaxial cartridge 10.

As also indicated in FIG. 1C and FIG. 2B, the inner end face 66 of the inner tube 28 and the inner surface 74 of the outer tube 26 comprise projections 94, 96, 96' that project into the spaces 30, 32 forming the first and second storage compartments.

The projections 94, 96, 96' cooperate with grooves 104, 106, 106' present at the first and second pistons 38, 40. The first piston 38 has the groove 104 which cooperates with the projections 94 and the second piston 40 has the grooves 106, 106' which cooperate with the projections 96, 96'.

The projections 94, 96, 96' are arranged in a circumferential manner and face away from the head part 12 along the longitudinal axis A of the coaxial cartridge 10. The projections 94, 96, 96' are configured to engage the grooves 104, 106, 106' of the pistons 38, 40 such that substantially no air is trapped between the inner end face 66 and a conveying side 38' of the first piston 38 and between the 74 and a conveying side 40" of the second piston 40.

These projections 94, 96, 96' are thus present, on the one hand, so that on front filling the cartridges no residual air is trapped in the cartridge that could diminish the desired and pre-defined storage life and that once the coaxial cartridge 10 has been emptied, i.e. the multi-component material M, M' has been dispensed therefrom, as little waste material as possible remains in the coaxial cartridge 10.

In a manner known per se the first and second pistons 38, 40 have sealing elements 108 arranged at inner and outer surfaces thereof that seal between the respective piston 38, 40 and the inner and outer tubes 28, 26.

Also indicated in FIG. 2B is the peeler device 110 that is coupled to sides 112 of the first and second pistons 38, 40 disposed opposite of the respective conveying sides 38', 40".

On using the coaxial cartridge 10 in a dispensing device (not shown), the cap 14 and the plunger 98 are typically removed and a mixing tip (not shown) is attached in their place at the outlet 14 via the external thread 18'.

An outer surface 14''' of the outlet 14 present between the external thread 18' and the outlet openings 58, 58' can be configured as a sealing surface that is adapted to seal between the outlet 14 and the mixing tip in order to form a barrier for the multi-component material M, M' and to ensure that this exits the mixing tip via an outlet of the mixing tip (not shown) and not via the external thread 18'.

It should further be noted that one or more slits (not shown) can be disposed in the outer surface 14''', with the one or more slits extending through the part 46 of the outer tube 26. If provided this slit enables a more facile method of introducing the part 44 of the inner tube 28 into the part 46, as the annular lip 42 can pry apart the part 46 more easily if this comprises a slit than if no slit is provided.

When inserting a plunger of a single component dispensing device (both not shown) into the piston end 22 the plunger presses against the peeler device 110 which in turn presses against the sides 112 of the first and second pistons 38, 40. Since single component dispensing devices typically only have one plunger the second piston 40 would not normally be actuated, and the wall 28' would also hinder the movement of the plunger along the longitudinal axis A towards the head part 12.

In order to ensure the second piston 40 is actuated the peeler device 110 is configured to also engage the second piston 40. Since the outer wall 28' at some point will inevitably contact the peeler device 110, the peeler device 110 has gaps present therein (not shown) and a plurality of cutting blades (also not shown).

The cutting blades are configured to cut the outer wall 28' in the longitudinal direction into strips. The cut strips of outer wall 28' are then guided via the gaps to an outwardly inclined wall 114 whereby the strips of outer wall 28' are deflected radially outwardly. The function of the peeler device in cooperation with the first and second pistons 38, 40 and the cutting and peeling of the outer wall 28' is known per se to the person skilled in the art.

A method of assembling the coaxial cartridge will be discussed in the following.

In a first step the outer tube 26 having the part 46 of the outlet 14 formed at the head part 12 of the outer tube 26 is provided. The outer tube 26 could e.g. be produced in an injection molding process.

In the next step the inner tube 28 is inserted into the outer tube 26, with the inner tube 28 comprising the remaining part of the outlet 14. The inner tube 28 could also e.g. be produced in an injection molding process. In this connection the inner and outer tubes 28, 26 can be made from the same material or from different materials as the case may be. The materials of the inner and outer tubes 28, 26 is generally selected in dependence on the materials M, M' to be stored therein.

Following this the inner tube 28 is connected to the outer tube 26 at the two points of connection 34, 36 that are present at the head part 12 to form the coaxial cartridge 10 with two storage compartments. The first point of connection 34 is formed by the snap fit connection 50 present at the outlet 14 and the second point of connection 36 is present at abutting end surfaces of the inner and outer tubes 28, 26.

It should be noted that a wall thickness of the cartridge wall 24, i.e. a wall thickness of the outer tube 26, is generally selected in the range of 1.5 to 2.2 mm, in particular in the range of 1.6 to 2 mm.

It should further be noted that a wall thickness of the inner tube 28 is generally selected in the range of 0.5 to 1.5 mm, in particular in the range of 0.7 to 1.2 mm.

The invention claimed is:

1. A coaxial cartridge for multi-component materials, the coaxial cartridge comprising:
    a head part having an outlet;
    an inner tube having a space therein, the space forming a first storage compartment configured to store a first component, a part of the inner tube forming a part of the outlet;
    an outer tube, the inner tube arranged within the outer tube at a longitudinal axis of the coaxial cartridge, with the longitudinal axis being common to both the inner tube and the outer tube, a space formed between the outer tube and the inner tube forming a second storage compartment configured to store a second component, and a part of the outer tube forms a further part of the outlet, the inner tube connected to the outer tube at first and second points of connection present at the head part, with the first and second points of connection being arranged at different positions at the head part, with the different positions being arranged spaced apart at different distances from the longitudinal axis, and the first point of connection formed at the outlet; and
    a seal member disposed between the inner tube and the outer tube at the head part, the seal member surrounding the second point of connection.

2. The coaxial cartridge in accordance with claim 1, wherein the first and second points of connection are different types of connections.

3. The coaxial cartridge in accordance with claim 1, wherein the outlet and the first point of connection are disposed at a further distance from the longitudinal axis than the second point of connection; or the first point of connection is eccentrically arranged with respect to the longitudinal axis.

4. The coaxial cartridge in accordance with claim 1, wherein the first point of connection is a radially outwardly projecting lip that is disposed at the part of the inner tube that projects into the part of the outer tube, with the radially outwardly projecting lip engaging a step-like portion disposed at the part of the outer tube into which the inner tube projects.

5. The coaxial cartridge in accordance with claim 1, wherein the first point of connection is a snap fit connection disposed at the outlet between the inner tube and the outer tube.

6. The coaxial cartridge in accordance with claim 1, wherein the second point of connection is disposed at a smaller distance from the longitudinal axis than the first point of connection.

7. The coaxial cartridge in accordance with claim 1, wherein the second point of connection is disposed between an inner surface of the outer tube that abuts an outer surface of the inner tube at the head part.

8. The coaxial cartridge in accordance with claim 1, wherein the second point of connection is a plug element disposed at the inner tube configured to cooperate with a counter plug element disposed at the outer tube.

9. The coaxial cartridge in accordance with claim 8, wherein the counter plug element is configured to receive the plug element, with the plug element being press fit into the plug receiving element.

10. The coaxial cartridge in accordance with claim 1, wherein the inner tube comprises a first cylindrical outlet portion as the part of the inner tube forming the part of the outlet that is inserted into a second cylindrical outlet portion disposed at the outer tube forming the further part of the outlet.

11. The coaxial cartridge in accordance with claim 10, wherein the part of the inner tube that projects into the part of the outer tube is formed by the cylindrical outlet portion and the part of the outer tube into which the inner tube projects is formed by the cylindrical outlet portion disposed at the outer tube, one or more sealing members are disposed between the cylindrical outlet portion of the inner tube and the cylindrical outlet portion of the outer tube.

12. The coaxial cartridge in accordance with claim 1, wherein the outlet is a side by side outlet comprising first and second outlets having first and second outlet openings.

13. The coaxial cartridge in accordance with claim 12, wherein the first and second outlets comprise inner sealing surfaces.

14. The coaxial cartridge in accordance with claim 12, wherein the first cylindrical outlet portion of the inner tube comprises a first passage leading from the first storage compartment to the first outlet opening of the outlet and a second passage leading from the second storage compartment to the second outlet opening of the outlet.

15. The coaxial cartridge in accordance with claim 12, wherein an area of the first outlet opening differs from an area of the second outlet opening.

16. The coaxial cartridge in accordance with claim 1, wherein the inner tube and the outer tube comprise projections that project from a respective end face formed at the head part into the first and second storage compartments, or further comprising first and second pistons arranged in each storage chamber at an end of the coaxial cartridge that is disposed opposite of the head part, or the first and second storage compartments comprise respective two-component materials.

17. A method of assembling the coaxial cartridge, in accordance with claim 1, the method comprising:
providing the outer tube having the part of the outlet formed at the head part of the outer tube,
inserting the inner tube into the outer tube, with the inner tube comprising a remaining part of the outlet;
connecting the inner tube to the outer tube at the first and second points of connection at the head part to form the coaxial cartridge with the first and second storage compartments, the first point of connection is formed at the outlet, and the second point of connection is formed between abutting surfaces of the inner tube and the outer tube.

18. A coaxial cartridge for multi-component materials, the coaxial cartridge comprising:
a head part having an outlet;
an inner tube having a space therein, the space forming a first storage compartment configured to store a first component, a part of the inner tube forming a part of the outlet; an outer tube, the inner tube arranged within the outer tube at a longitudinal axis of the coaxial cartridge, with the longitudinal axis being common to both the inner tube and the outer tube, a space formed between the outer tube and the inner tube forming a second storage compartment configured to store a second component, and a part of the outer tube forms a further part of the outlet, the inner tube connected to the outer tube at first and second points of connection present at the head part, with the first and second points of connection being arranged at different positions at the head part, with the different positions being arranged spaced apart at different distances from the longitudinal axis, the first point of connection formed at the outlet, and the second point of connection disposed between an inner surface of the outer tube that abuts an outer surface of the inner tube at the head part; and
a seal member formed between the inner tube and the outer tube at the head part, the seal member surrounding the second point of connection, and formed between the inner surface of the outer tube that abuts the outer surface of the inner tube.

19. A coaxial cartridge for multi-component materials, the coaxial cartridge comprising:
a head part having an outlet, the outlet being a side by side outlet comprising first and second outlets having first and second outlet openings and comprising inner sealing surfaces;
an inner tube having a space therein, the space forming a first storage compartment configured to store a first component, a part of the inner tube forming a part of the outlet; an outer tube, the inner tube arranged within the outer tube at a longitudinal axis of the coaxial cartridge, with the longitudinal axis being common to both the inner tube and the outer tube, a space formed between the outer tube and the inner tube forming a second storage compartment configured to store a second component, and a part of the outer tube forms a further part of the outlet, the inner tube connected to the outer tube at first and second points of connection present at the head part, with the first and second points of connection being arranged at different positions at the head part, with the different positions being arranged spaced apart at different distances from the longitudinal axis, and the first point of connection formed at the outlet; and a supporting rib disposed between the cylindrical outlet portion of the outer tube and the cylindrical outlet portion of the inner tube, with the supporting rib being provided at a same axial height as the inner sealing surfaces or offset from the inner sealing surfaces or between the axial height of the supporting rib and a respective inlet opening of a passage of the outlet, the supporting rib arranged directly adjacent to the axial height of the inner sealing surface.

* * * * *